United States Patent [19]
Weder et al.

[11] Patent Number: 5,332,610
[45] Date of Patent: * Jul. 26, 1994

[54] SELF ADHERING WRAPPING MATERIAL FOR WRAPPING FLOWER POTS AND METHOD OF USING SAME

[75] Inventors: Donald E. Weder, Highland; William F. Straeter, Breese; Joseph G. Straeter, Highland, all of Ill.; Franklin J. Craig, Valley Park, Mo.; Wilma M. Donnelly, Highland, Ill.; Jack W. Redditt, Nashville, Tenn.

[73] Assignee: Highland Supply Corporation, Highland, Ill.

[*] Notice: The portion of the term of this patent subsequent to Jul. 9, 2008 has been disclaimed.

[21] Appl. No.: 889,654

[22] Filed: May 27, 1992

Related U.S. Application Data

[63] Continuation of Ser. No. 677,225, Mar. 29, 1991, Pat. No. 5,199,242, which is a continuation-in-part of Ser. No. 368,597, Jun. 20, 1989, Pat. No. 5,007,229, which is a continuation-in-part of Ser. No. 249,761, Sep. 26, 1988, abandoned, which is a continuation-in-part of Ser. No. 219,083, Jul. 13, 1988, Pat. No. 4,897,031, which is a continuation of Ser. No. 4,275, Jan. 5, 1987, Pat. No. 4,773,182, which is a continuation of Ser. No. 613,080, May 22, 1984, abandoned, and a continuation-in-part of Ser. No. 232,541, Aug. 11, 1988, Pat. No. 4,835,834, which is a continuation of Ser. No. 876,405, Jun. 20, 1986, abandoned.

[51] Int. Cl.⁵ .............................................. A01G 9/02
[52] U.S. Cl. ...................................... 428/99; 428/64; 428/66; 428/35.7; 428/192; 428/213; 428/215; 428/409; 428/516; 47/72; 53/397; 53/461; 229/87.01; 229/87.06; 229/87.19
[58] Field of Search ................... 428/99, 64, 66, 35.4, 428/35.7, 516, 213, 215, 192, 409; 47/72; 53/397, 461; 229/87.01, 87.06, 87.19

[56] References Cited

U.S. PATENT DOCUMENTS

| | | | |
|---|---|---|---|
| 1,446,563 | 2/1923 | Hughes | 47/72 |
| 2,529,060 | 11/1950 | Trillich | 428/211 |
| 2,925,208 | 2/1960 | Wood | 47/72 |
| 3,271,922 | 9/1966 | Wallerstein | 53/399 |
| 3,945,495 | 3/1976 | Carmody | 428/195 |
| 4,300,312 | 11/1981 | Weder | 47/72 |
| 4,367,256 | 1/1983 | Biel | 428/218 |
| 4,518,654 | 5/1985 | Eichbauer | 428/331 |
| 4,733,521 | 3/1988 | Weder | 47/72 |
| 4,773,182 | 9/1988 | Weder | 47/72 |
| 4,835,834 | 6/1989 | Weder | 47/72 |
| 5,029,412 | 7/1991 | Weder | 47/72 |
| 5,111,613 | 5/1992 | Weder | 47/72 |
| 5,152,100 | 10/1992 | Weder | 47/72 |
| 5,152,101 | 10/1992 | Weder | 47/72 |
| 5,181,339 | 1/1993 | Weder | 47/72 |

FOREIGN PATENT DOCUMENTS

| | | | |
|---|---|---|---|
| 2477107 | 9/1981 | France | 47/72 |
| 161005 | 6/1933 | Switzerland | |
| 560532 | 4/1975 | Switzerland | |

Primary Examiner—Alexander S. Thomas
Assistant Examiner—Nasser Ahmad
Attorney, Agent, or Firm—Dunlap, Codding & Lee

[57] ABSTRACT

A wrapping material comprising a sheet of material such as paper, cellophane, foil, or man-made organic polymer film and a cling material such as polyethylene secured to a portion of the sheet of material. The cling material connects to the sheet of material and/or itself as the wrapping material is wrapped about a flower pot thereby securing the sheet of material about the flower pot. A method of wrapping a flower pot by wrapping the flower pot with the wrapping material.

12 Claims, 8 Drawing Sheets

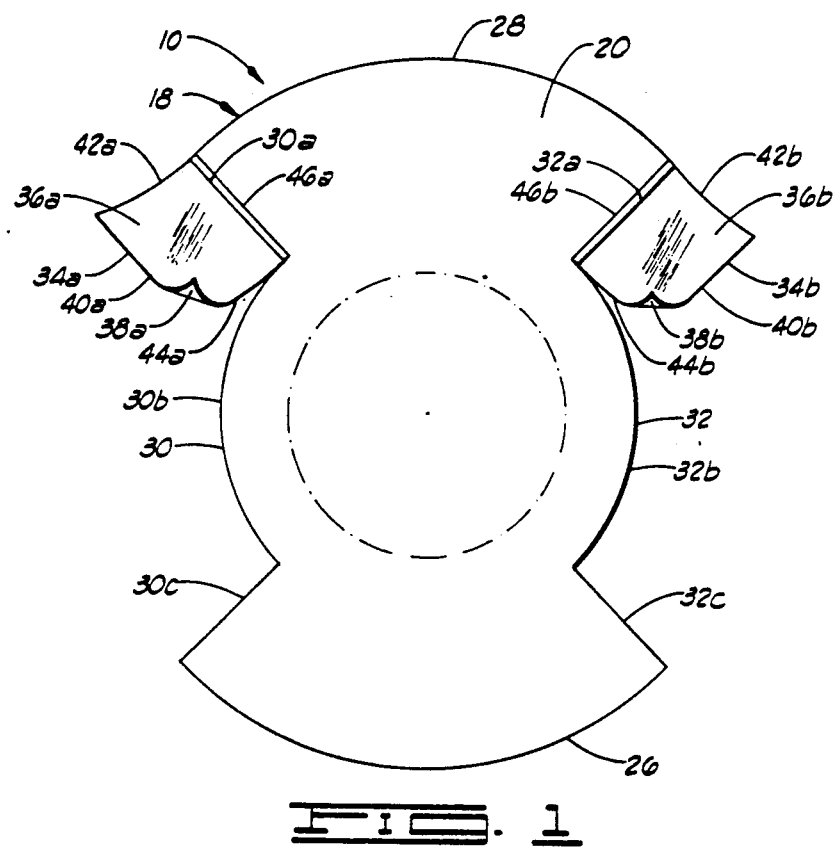
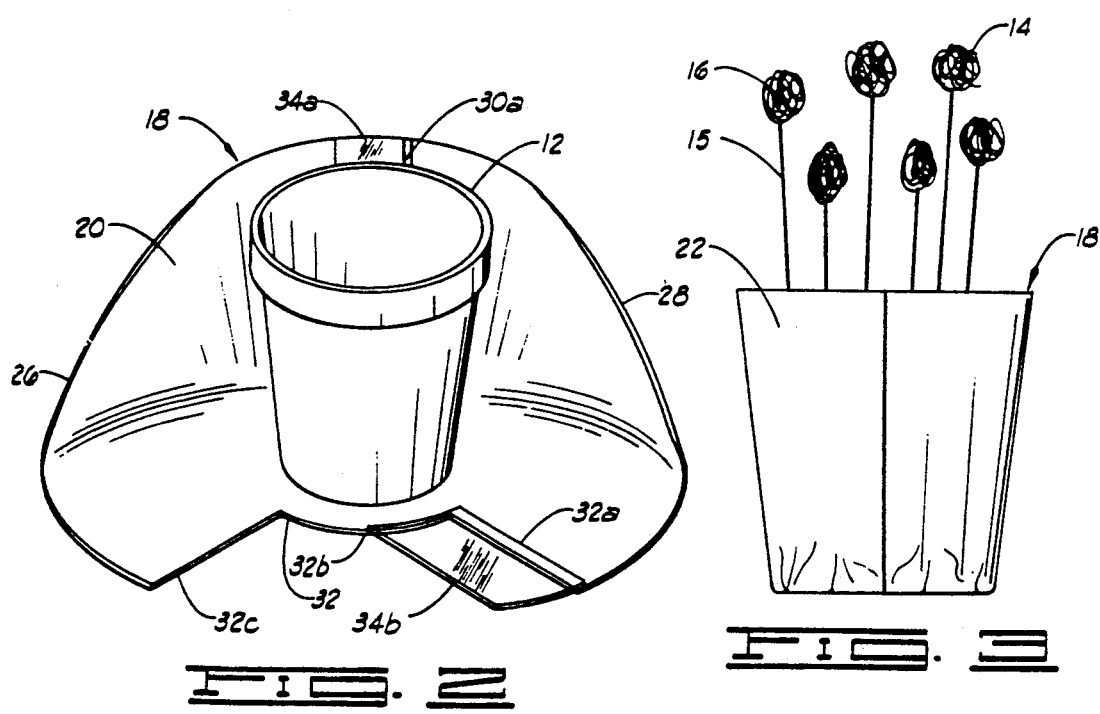

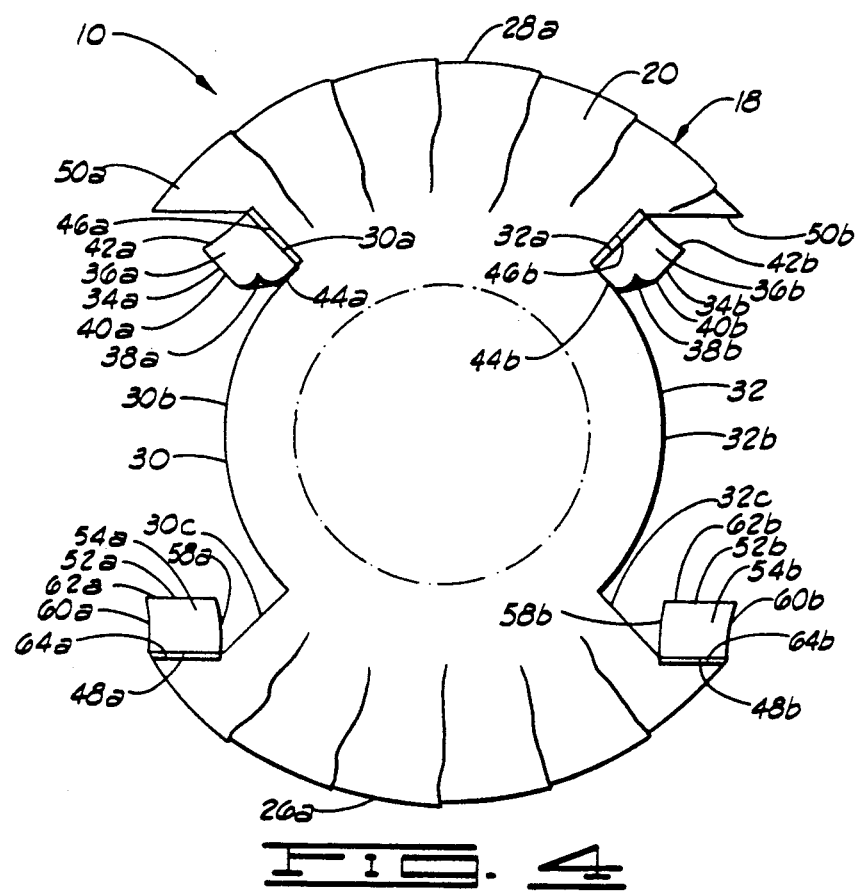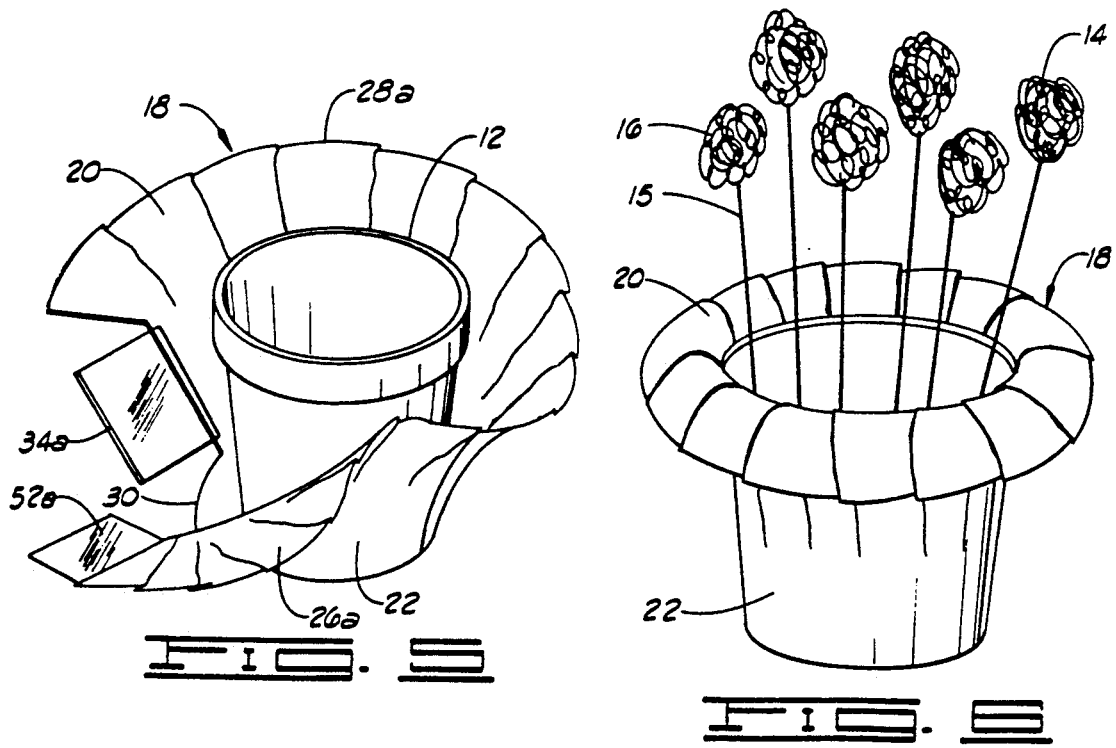

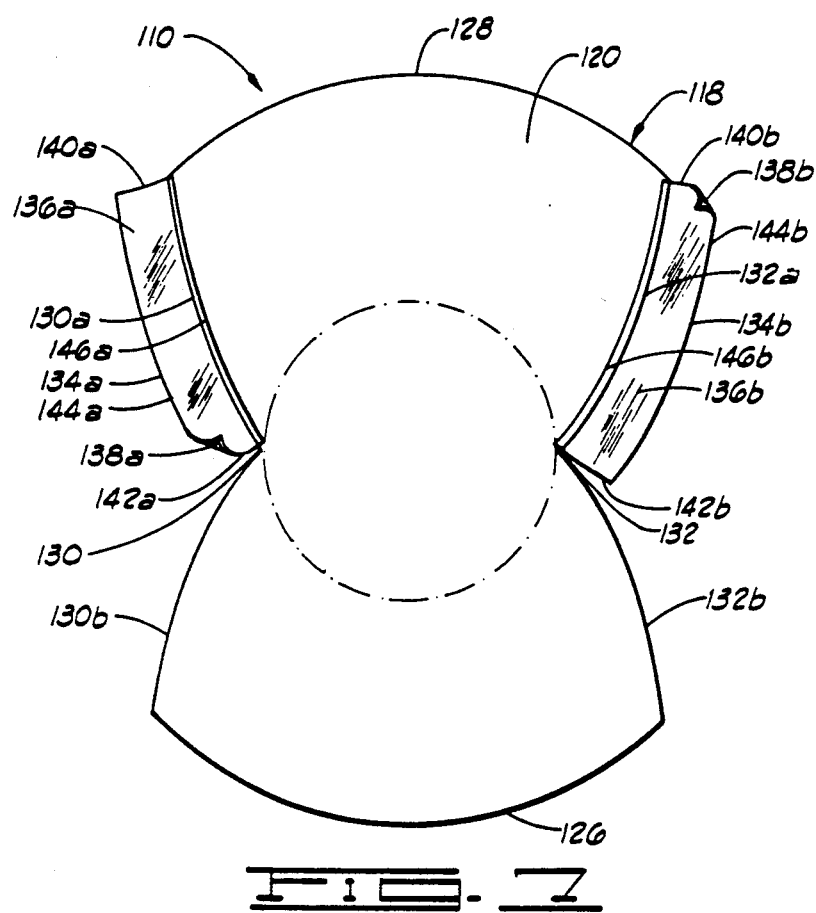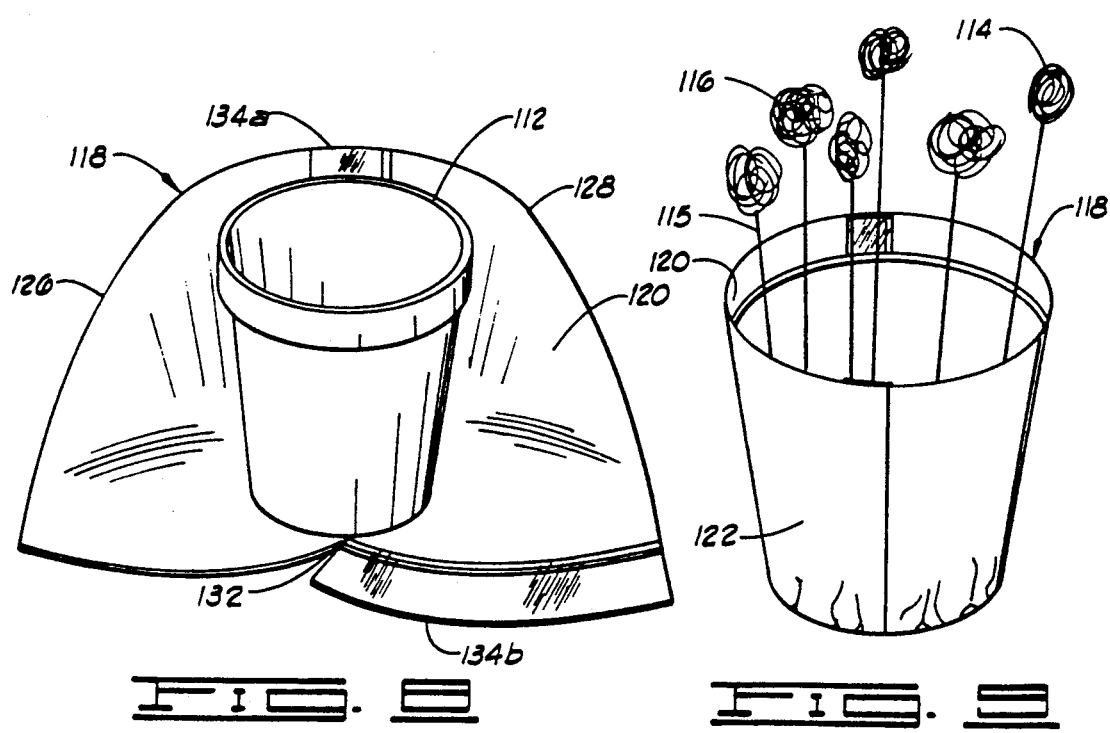

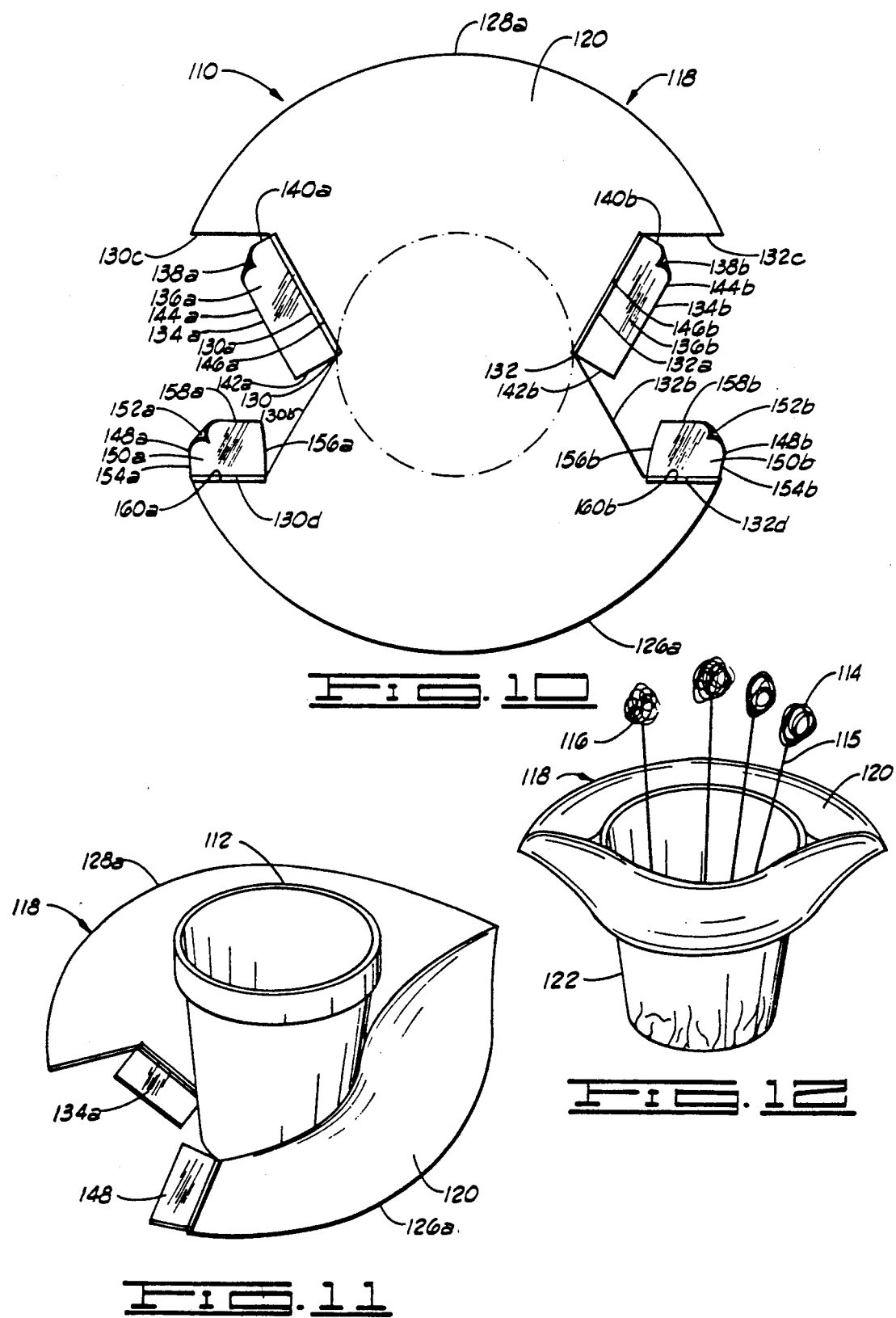

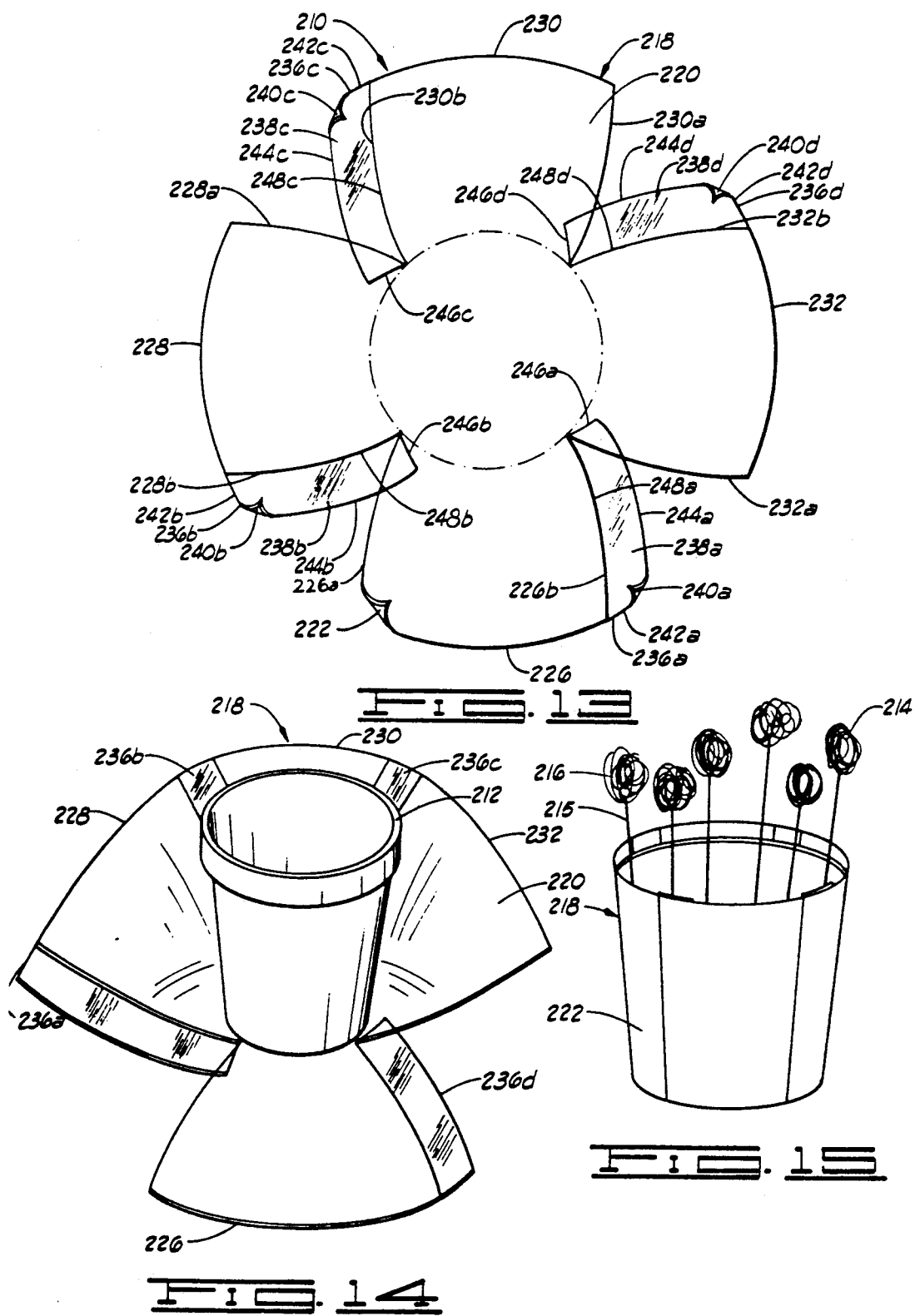

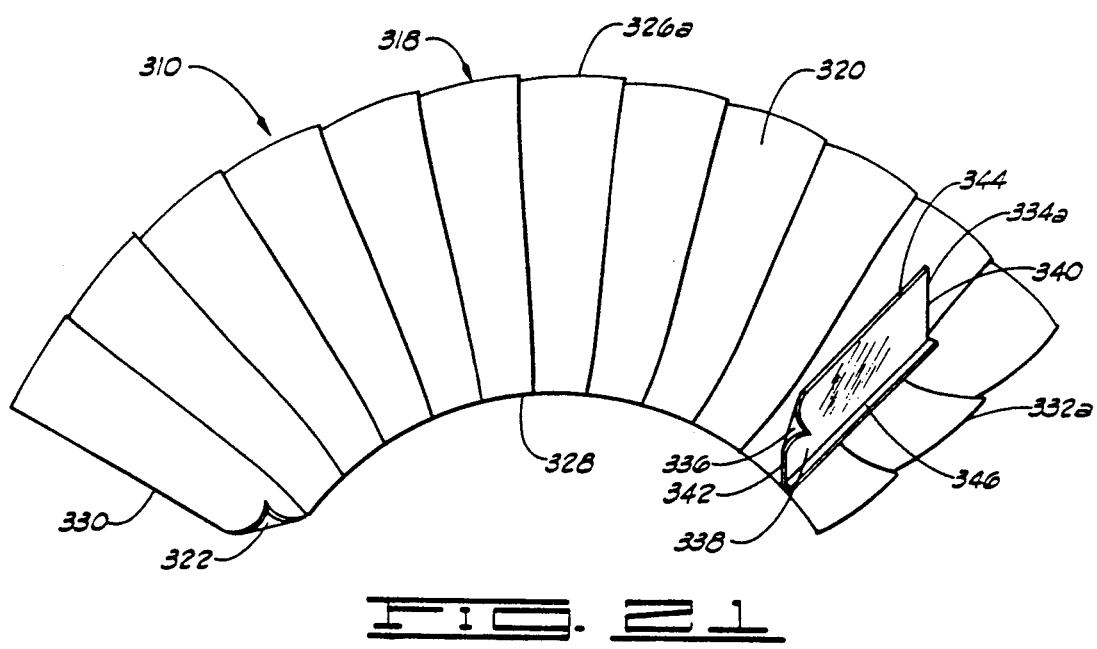
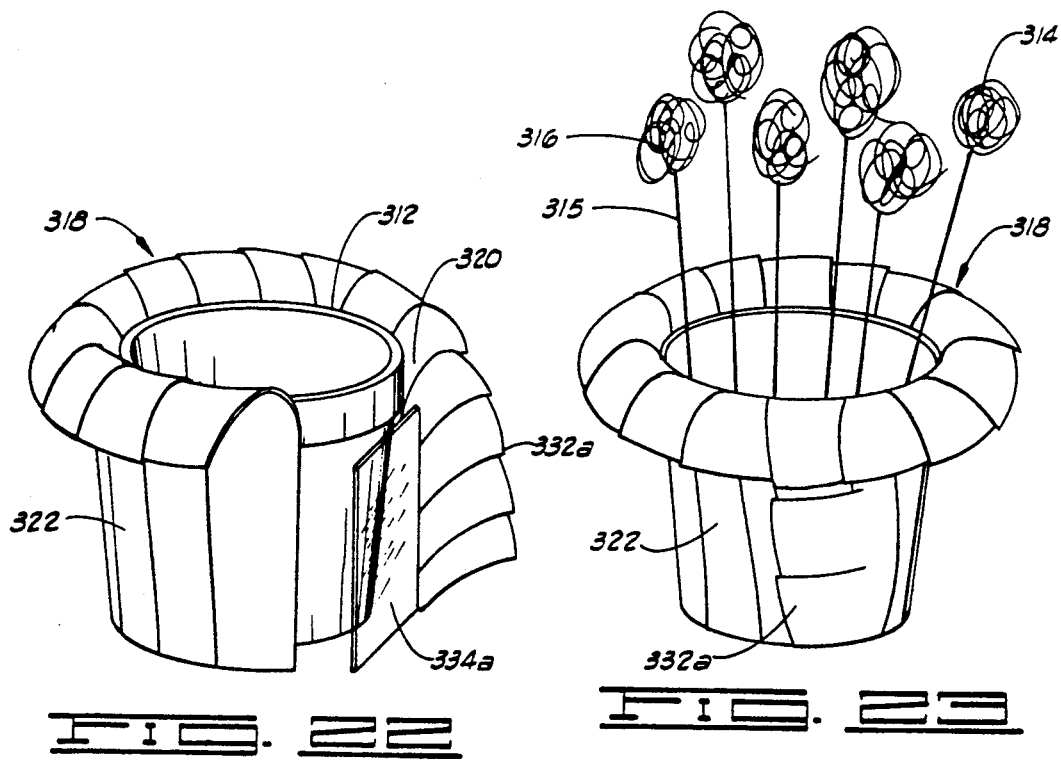

SELF ADHERING WRAPPING MATERIAL FOR WRAPPING FLOWER POTS AND METHOD OF USING SAME

CROSS REFERENCE TO RELATED APPLICATIONS

This is a continuation of co-pending application U.S. Ser. No. 07/677,225 filed on Mar. 29, 1991 is now U.S. Pat. No. 5,199,242, entitled SELF ADHERING WRAPPING MATERIAL FOR WRAPPING FLOWER POTS AND METHOD OF USING SAME, which is a continuation-in-part of U.S. Ser. No. 07/368,597 filed on Jun. 20, 1989 entitled METHOD OF WRAPPING UTILIZING A SELF ADHERING WRAPPING MATERIAL, now U.S. Pat. No. 5,007,229, which is a continuation-in-part of U.S. Ser. No. 07/249,761 filed on Sep. 26, 1988 entitled METHOD AND APPARATUS FOR COVERING PORTIONS OF AN OBJECT WITH A SHEET OF MATERIAL HAVING A PRESSURE SENSITIVE ADHESIVE COATING APPLIED TO AT LEAST A PORTION OF AT LEAST ONE SURFACE OF THE SHEET OF MATERIAL, now abandoned, which is a continuation-in-part of U.S. Ser. No. 07/219,083, filed Jul. 13, 1988, entitled ARTICLE FORMING SYSTEM, now U.S. Pat. No. 4,897,031, which is a continuation of U.S. Ser. No. 07/004,275, filed Jan. 5, 1987, entitled ARTICLE FORMING SYSTEM, now U.S. Pat. No. 4,773,182, which is a continuation of U.S. Ser. No. 06/613,080, filed May 22, 1984, entitled ARTICLE FORMING SYSTEM, now abandoned, and a continuation-in-part of U.S. Ser. No. 07/232,541, filed Aug. 11, 1988, entitled FLOWER POT ACCESSORY, now U.S. Pat. No. 4,835,834, which is a continuation of U.S. Ser. No. 06/876,405, filed Jun. 20, 1986, entitled FLOWER POT ACCESSORY, now abandoned.

Application U.S. Ser. No. 249,761, 219,083, 004,275 (U.S. Pat. No. 4,773,182), and 232,541, described above, are hereby incorporated by reference.

FIELD OF THE INVENTION

The present invention generally relates to wrapping material utilized in wrapping a flower pot and methods of using same.

SUMMARY OF THE INVENTION

The present invention comprises a wrapping material for wrapping about at least a portion of a flower pot, comprising a sheet of material having an upper surface and a lower surface sufficiently sized to wrap at least a portion of the flower pot; and a cling material secured to a portion of the sheet of material. The cling material is capable of connecting to the sheet of material and itself upon contacting engagement. The sheet of material with the cling material connected thereto is wrappable about the flower pot whereby portions of the cling material contactingly engage and connect to other portions of the wrapping material for generally securing the sheet of material wrapped about at least a portion of the flower pot.

In accordance with the method of the present invention, a wrapping material as described heretofore is wrapped about a flower pot by disposing the sheet of material about the flower pot so that portions of the cling material contactingly engage and connect to portions of the wrapping material for generally securing the sheet of material about at least a portion of the flower pot.

BRIEF DESCRIPTION OF THE DRAWINGS

FIG. 1 is a top plan view of a wrapping material constructed in accordance with the present invention.

FIG. 2 is a perspective view of the wrapping material of the present invention, illustrating one method of wrapping a flower pot.

FIG. 3 is a perspective view of the wrapping material of the present invention, illustrating a wrapped flower pot containing a floral arrangement.

FIG. 4 is a top plan view of another embodiment of the wrapping material of the present invention. FIG. 5 is a perspective view of the wrapping material of the present invention, illustrating one method of wrapping a flower pot.

FIG. 6 is a perspective view of the wrapping material of the present invention, illustrating a wrapped flower pot containing a floral arrangement.

FIG. 7 is a top plan view of another embodiment of the wrapping material of the present invention.

FIG. 8 is a perspective view of the wrapping material of the present invention, illustrating one method of wrapping a flower pot.

FIG. 9 is a perspective view of the wrapping material of the present invention, illustrating a wrapped flower pot containing a floral arrangement.

FIG. 10 is a top plan view of another embodiment of the wrapping material of the present invention.

FIG. 11 is a perspective view of the wrapping material of the present invention, illustrating one method of wrapping a flower pot.

FIG. 12 is a perspective view of the wrapping material of the present invention, illustrating a wrapped flower pot containing a floral arrangement.

FIG. 13 is a top plan view of another embodiment of the wrapping material of the present invention.

FIG. 14 is a perspective view of the wrapping material of the present invention, illustrating one method of wrapping a flower pot.

FIG. 15 is a perspective view of the wrapping material of the present invention, illustrating a wrapped flower pot containing a floral arrangement.

FIG. 21 is a top plan view of another embodiment of the wrapping material of the present invention.

FIG. 22 is a perspective view of the wrapping material of the present invention illustrating one method of wrapping a flower pot.

FIG. 23 is a perspective view of the wrapping material of the present invention, illustrating a flower pot containing a floral arrangement wrapped.

DESCRIPTION OF THE PREFERRED EMBODIMENTS

Figure 16:
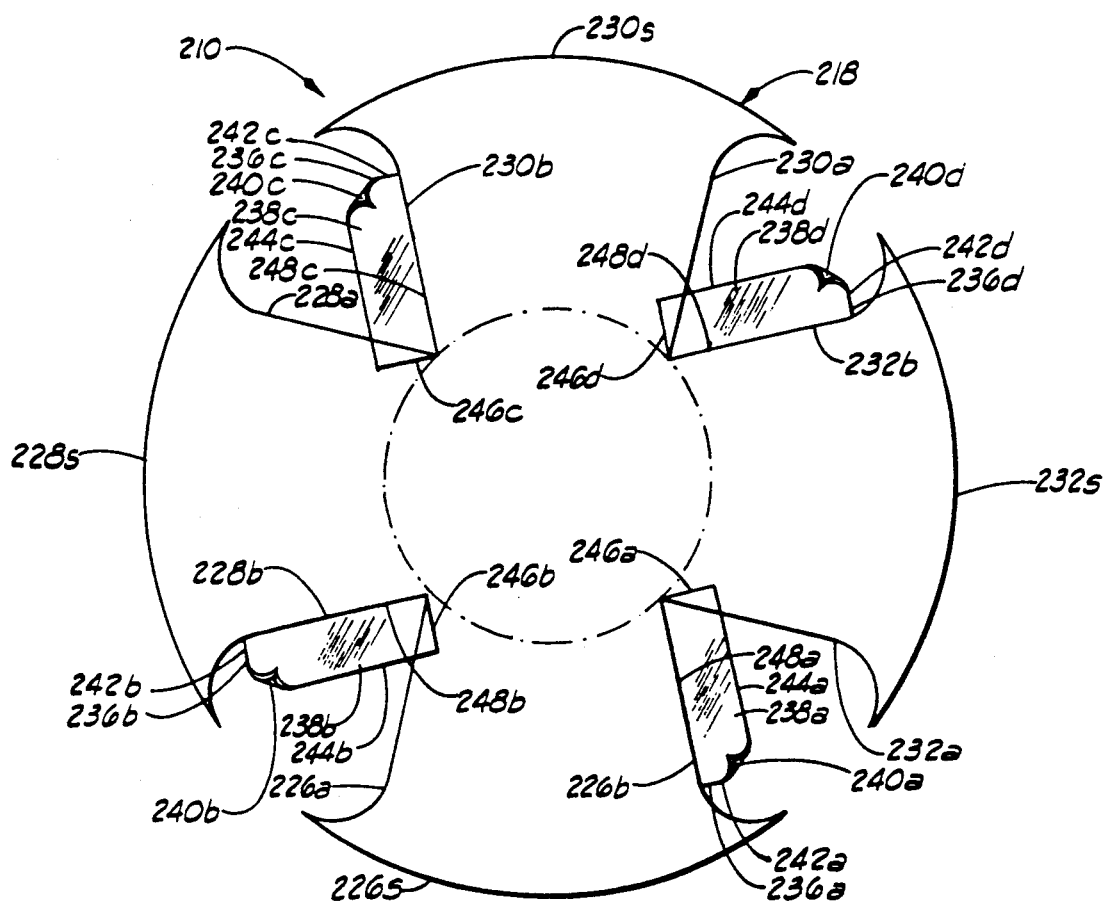
FIG. 16 is a top plan view of another embodiment of the wrapping material of the present invention.

The Preferred Embodiments of FIGS. 1, 2 and 3

Referring to FIGS. 1, 2 and 3, shown herein and designated generally by the reference numeral 10 is a wrapping material which is constructed in accordance with the present invention for wrapping at least a portion of a flower pot. The wrapping material 10 may be utilized to wrap any flower pot in accordance with the present invention. One such flower pot is shown in FIGS. 2 and 5, and is designated by the numeral 12. The flower pot 12 preferably contains a floral arrangement 14, which may have a stem portion 15 and a growing portion 16 such as metals, as illustrated in FIGS. 3 and 6.

"Floral arrangement" as used herein means cut fresh flowers, artificial flowers, other fresh and/or artificial plants or other floral materials and may include other secondary plants and/or ornamentation which add to the aesthetics of the overall floral arrangement.

Referring to FIG. 1, the wrapping material comprises a sheet of material 18 having an upper surface 20 and a lower surface 22 ( shown in FIG. 3 ). The sheet of material 18 is sized sufficiently to wrap at least a portion of the flower pot 12. The sheet of material 18 may be any shape, but preferably has at least two arcuate ends.

The sheet of material 18 may be constructed from any suitable material that is capable of being wrapped about a flower pot 12. Preferably, the sheet of material 18 comprises cloth, paper (untreated or treated in any manner), cellophane, foil, man-made organic polymer film or combinations thereof.

In one preferred embodiment, the sheet of material 18 is constructed from a relatively thin film of a substantially non-shape sustaining processed organic polymer film. The term "processed organic polymer film" as used herein means a man-made resin such as a polypropylene as opposed to naturally occurring resins such as cellophane.

A processed organic polymer film is relatively strong and not as subject to tearing (substantially non-tearable), as might be the case with paper or foil. The processed organic polymer film is a substantially linearly linked processed organic polymer film and is a synthetic linear chain organic polymer where the carbon atoms are substantially linearly linked. Such films are synthetic polymers formed or synthesized from monomers. Further, a relatively substantially linearly linked processed organic polymer film is virtually waterproof which may be desirable in many applications such as wrapping a floral arrangement.

Additionally a relatively thin film of substantially linearly linked processed organic polymer does not substantially deteriorate in sunlight. Processed organic polymer films having carbon atoms, both linearly linked and cross linked, and some cross linked polymer films, also may be suitable for use in the present invention provided such films are substantially flexible and can be made in a sheet-like format for wrapping purposes of the present invention.

A decorative pattern, such as a color and/or an embossed pattern, and/or other decorative surface ornamentation may be applied to the upper surface 20 and/or lower surface 22 of the sheet of material 18 or portions thereof. The sheet of material 18 also may be totally or partially clear or tinted transparent material.

The sheet of material 18 may be constructed of a single sheet of material or a plurality of sheets. Any thickness of the sheet of material 18 may be utilized in accordance with the present invention as long as the sheet of material 18 is wrappable about at least a portion of the flower pot 12 and the cling material is capable of securing same, as described herein. Typically the sheet of material has a thickness in a range of less than about 0.2 mils to about 10 mils. In a preferred embodiment, the sheet of material 18 is constructed from one transparent sheet of man-made organic polymer film having a thickness in a range of from less than about 0.5 mils to about 2.5 mils. It will be appreciated that the sheet of material 18 is substantially flat.

Referring again to FIG. 1, the sheet of material 18 also comprises a first end 26 and a second end 28, both of which are arcuately shaped, and define the outer periphery of the sheet 18. The sheet of material 18 also comprises the notched and arcuately shaped third end 30 and a fourth end 32, respectively. The third end 30 has a first side 30a, a second side 30b, and a third side 30c; the fourth end 32 has a first side 32a, a second side 32b, and a third side 32c.

The wrapping material also comprises cling materials, generally designated, in FIGS. 1 and 2, by the numerals 34a and 34b, which are secured to the sheet of material 18. The cling materials 34a–b may be secured to the sheet of material 18 at any position on the sheet of material 18 which permits the engagement of the cling materials 34a–b with the sheet of material 18 and/or itself as described herein. Any manner of securing the cling material 34a–b to the sheet of material 18 may be utilized which permits the cling materials 34a–b to remain securely fastened to the sheet of material 18 during and after the wrapping process described hereafter. Preferably a portion of the cling materials 34a–b are heat sealed to the sheet of material 18, although adhesives also may be utilized.

"Heat sealing" is defined as any heating means which causes a permanent engagement between two items when so treated. Preferably, the heat sealing bonds the cling materials to the sheet of material by causing the cling materials to become partially disposed to the sheet of material.

The adhesive which may alternatively be used for this attachment may be any one of those commercially available which provides a permanent engagement between items. The adhesive is preferably placed upon at least a portion of the cling material, although the adhesive could also be applied to the sheet of material 18. The adhesive causes at least a portion of the cling material to become permanently engaged to the sheet of material.

The cling materials 34a–b may be any material which is capable of connecting to the sheet of material 18 and/or itself upon contacting engagement during the wrapping process. Such cling materials 34a–b are wrappable about a flower pot 12, whereby portions of the cling materials 34a–b contactingly engage and connect to other portions of the wrapping material 10 for generally securing the sheet of material 18 wrapped about at least a portion of the flower pot 12. This connecting engagement is preferably temporary in that the wrapping material 10 may be easily removed without tearing same, i.e., the cling material "clings" to the wrapping material 10. However, the present invention also contemplates a wrapping material which remains securely connected to and about the wrapped flower pot until the wrapping material is torn therefrom.

Preferably, the cling materials 34a-b are constructed and treated if necessary, from polyethylene such as Cling Wrap made by GladN, First Brands Corporation, Danbury, Conn. The thickness of the cling material will, in part, depend upon the thickness of the sheet of material utilized, i.e., generally, the thicker and therefore heavier sheet of material may require a thicker and therefore stronger cling material. Generally, the cling material will range in thickness from less than about 0.2 mils to about 10 mils, and preferably less than about 0.5 mils to about 2.5 mils and most preferably from less than about 0.6 mils to about 2 mils. However, any thickness of cling material may be utilized in accordance with the present invention which permits the cling material to function as previously described.

Any shape or amount of cling materials 34a-b may be utilized with the present invention which permits the wrapping material 10 to be secured about the flower pot 12. The entire surface of the sheet of material 18 may be covered with the cling material (not shown). Preferably, however, a strip of sheet-like cling material is secured to one side of the sheet of material 18. In this manner, only a portion of the cling materials 34a-b may overlap on or connect to the sheet of material 18, as illustrated in FIGS. 2 and 3, for securing purposes so that substantial portions of both sides of the cling materials 34a-b will be available for contacting the wrapping material 10.

The cling materials 34a-b, as illustrated in FIG. 1, comprise an upper surface 36a and 36b, a lower surface 38a and 38b (the edges lifted for illustration purposes only), a first end 40a and 40b, a second end 42a and 42b, a third end 44a and 44b, and a fourth end 46a and 46b, respectively. The fourth ends 46a-b of cling materials 34a-b are attached near the first side 30a of the third end 30 of the sheet 18, and the first side 32a of the fourth end of the sheet of material 18, respectively, by any method described herein.

FIGS. 2 and 3 illustrate one method of use of the present invention. A flower pot 12 is preferably placed on the center of the upper surface 20 of the sheet of material 18. Portions of the wrapping material 10 are then positioned about a portion of the flower pot 12 to be wrapped so that the cling materials 34a-b are positioned to connect either to itself or the sheet of material 18 upon wrapping and thereby secure the sheet of material 18 about the item.

The sheet 18 is then shaped around the flower pot 12 by folding or wrapping, so that the sheet 18 covers at least a portion of the flower pot 12. The lower surface 38a of the cling material 34a connects to the upper surface 20 of the sheet of material 18, overlaying past the third side 30c of the third end 30 of the sheet 18. Third end 30 and associated second side 30b are crumpled toward the flower pot 12 (not shown), to permit the sheet 18 to wrap around at least a portion of the flower pot 12. The lower surface 38b of the cling material 34b similarly engages the sheet of material 18, to effectively wrap the flower pot 12. That is, cling material 34b engages the upper surface 20 of the sheet 18, overlaying past the third side 32c of the fourth end 32 of the sheet 18 (not shown).

The Preferred Embodiments of FIGS. 4, 5 and 6

Referring to FIG. 4, the embodiment therein is substantially the same as the one previously described in FIG. 1. The only difference between FIG. 1 and FIG. 4 is the ruffled extended first end 26a and second end 26b shown in FIG. 4, which are extended forms of the first end 26 and the second end 28 of the sheet of material 18 (shown in FIG. 1), which form a skirt around the wrapped flower pot, as illustrated in FIG. 6.

The ruffled extended ends 26a and 26b create additional sides on both the third end 30 and the fourth end 32 of the sheet of material 18. Specifically, the third end 30 has a fourth side 48a and a fifth side 50a. Similarly, fourth end 32 has a fourth side 48b and a fifth side 50b.

Attached to the ruffled skirt 26a are cling materials 52a and 52b. Cling materials 52a-b, respectively, have an upper surface 54a and 54b, and a lower surface 56a and 56b (not shown). Cling materials 52a-b also have a first end 58a and 58b, a second end 60a and 60b, a third end 62a and 62b, and a fourth end 64a and 64b, respectively. The fourth end 64a of cling material 52a is attached near the fifth side 50a of the third end 30 of the sheet of material 18. Similarly, the fourth end 64b of cling material 52b is attached near the fifth side 50b of the fourth end 32 of the sheet 18. Both cling materials 52a-b are connected to the sheet 18 in any manner described herein.

FIGS. 5 and 6 illustrate one method of use of the present invention. A flower pot 12 is placed, preferably, on the center of the upper surface 20 of sheet of material 18. The sheet 18 is shaped around the flower pot 12 by folding or wrapping, so that the sheet 18 covers at least a portion of the flower pot 12.

The upper surface 54b of the cling material 52b overlays and engages the lower surface 22 of the sheet 18 near the fifth side 50b of the fourth end 32 (not shown). The lower surface 38b of the cling material 34b overlays and engages the sheet 18 near the third side 32c of the fourth end 32, on the upper surface 20 of the sheet of material 18 (not shown).

Cling materials 34a and 52a also engage the sheet of material 18, to effectively wrap the flower pot 12. That is, the lower surface 38a of the cling material 34a engages the upper surface 20 of the sheet 18, overlaying past the third side 30c of the third end 30 of the sheet 18. And, the upper surface 54a of the cling material 52a engages the lower surface 22 of the sheet 18, overlaying past the fifth side 50a of the third end 30 of the sheet 18.

The Preferred Embodiment of FIGS. 7, 8 and 9

Another preferred embodiment of the present invention is shown in FIGS. 7, 8 and 9. The wrapping material, generally designated by numeral 110, is used to wrap a flower pot 112, which preferably contains a flower arrangement 114. The flower arrangement 114 may also have a stem portion 115 and a growing portion 116. The wrapping material 110 of the present embodiment comprises a sheet of material 118.

Referring to FIG. 7, the sheet of material 118 comprises an upper surface 120 and a lower surface 122 (shown FIG. 9). The sheet of material 118 further comprises a first end 126 and a second end 128, both of which are arcuately shaped, which define the outer periphery of the sheet 118. The sheet of material 118 also has a first V-shaped indentation 130 and a second V-shaped indentation 132. Immediately above the first indentation 130 is a first side 130a, and just below first indentation 130 is a second side 130b. Immediately above the second indentation 132 is a third side 132a; just below second indentation 132 is a fourth side 132b.

The sheet 118 also has cling material 134a and 134b. Cling material 134a–b comprise an upper surface 136a and 136b, a lower surface 138a and 138b (the edges are lifted for illustration purposes only), a first end 140a and 140b, a second end 142a and 142b, a third end 144a and 144b, and a fourth end 146a and 146b, respectively. The fourth end 146a of the cling material 134a is connected to the sheet 118 above the first indentation, along the first side 130a. The fourth end 146b of the cling material 134b is connected to the sheet 118 above the second indentation 132, along the second side 132a. Both cling materials 134a–b are attached to the sheet of material 118 in any manner described herein.

FIGS. 8 and 9 illustrate one method of use of the present invention. A flower pot 112 is placed on the center of the sheet of material 118, between the first V-shaped indentation 130 and the second V-shaped indentation 132. The sheet 118 is shaped around the flower pot 112 by folding or wrapping, so that the sheet 118 covers at least a portion of the flower pot 112.

The lower surface 138a of the cling material 134a is shown attached to the upper surface 120 of the sheet of material 118, overlaying past the second side 130b (not shown) of the sheet 118. To completely wrap the flower pot 112, as illustrated in FIG. 9, the lower surface 138b of the cling material 134b similarly engages the upper surface 120 of the sheet of material 118 (not shown), overlaying past the second side 132b, below the second indentation 132, to effectively wrap the flower pot 112.

The Preferred Embodiments of FIGS. 10, 11 and 12

Referring to FIG. 10, the embodiment therein is substantially similar to one previously described. The primary differences between FIG. 7 and FIG. 10 are the skirts 126a and 128a shown in FIG. 10, which are incorporated as extensions of the first end 126 and the second end 128 respectively, of the sheet of material 118 (shown in FIG. 7). An alternative preferred embodiment would utilize ruffled skirts, such as those illustrated in FIGS. 4, 5 and 6.

Four additional sides are formed as a result of the skirts 126a and 128a. And two additional cling materials are connected to the sheet 118. Referring to FIG. 10, immediately adjacent to first side 130a is fifth side 130c; similarly, immediately adjacent to second side 130b is sixth side 130d. Also, immediately adjacent to the third side 132a is seventh side 132c; immediately adjacent to the fourth side 132b is the eighth side 132d. Two additional cling materials 148a and 148b, respectively, are attached to the sixth side 130d and the eighth side 132d of the sheet of material 118.

Cling materials 148a–b, respectively, have an upper surface 150a and 150b and a lower surface 152a and 152b. Cling materials 148a–b, also have a first side 154a and 154b, a second side 156a and 156b, a third side 158a and 158b, and a fourth side 160a and 160b, respectively. The fourth sides 160a–b of the cling materials 148a–b are attached to the sixth side 130d and the eighth side 132d, respectively, of the sheet of material 118, by any method described herein.

FIGS. 11 and 12 illustrate one method of use of the present invention. A flower pot 112 is placed on the center of the sheet of material 118, between the first V-shaped indentation 130 and the second V-shaped indentation 132, as shown in FIG. 11. The sheet 118 is shaped around the flower pot 112 by folding or wrapping, so that the sheet 118 covers at least a portion of the flower pot 112. The lower surface 138b of the cling material 134b connects to the upper surface 120 of the sheet of material 118, overlaying past the fourth side 132b of the sheet 118 (not shown). Further, the upper surface 150b of the cling material 148b is attached to the lower surface 122 of the sheet of material 118, overlaying past the seventh side 132c of the right indentation 132 (not shown).

As shown in FIG. 12, cling material 134a similarly engages the sheet of material 118, to effectively wrap the flower pot 112. That is, the lower surface 138a of the cling material 134a connects to the upper surface 120 of the sheet 118, overlaying past the second side 130b of the sheet 118 (not shown); the upper surface 150a of the cling material 148a connects to the lower surface 122 of the sheet 118, overlaying past the fifth side 130c of the second indentation 130a (not shown).

The Preferred Embodiment of FIGS. 13, 14, 15, 16 and 17

Another preferred embodiment of the present invention is shown in FIGS. 13, 14 and 15. The wrapping material, generally designated by numeral 210, is used to wrap a flower pot 212, which preferably contains a flower arrangement 214 having a stem portion 215 and a growing portion 216. The wrapping material 210 of the present embodiment comprises a sheet of material 218.

Referring to FIG. 13, the sheet of material 218 comprises an upper surface 220 and a lower surface 222 (the edge is lifted for illustration purposes only). The sheet of material 218 further comprises a first end 226 and a second end 228, a third end 230 and a fourth end 232, all of which extend in an arcuate manner from the center of the sheet 218.

The four ends 226, 228, 230 and 232 of the sheet of material 218 form a quadrafoliate shape. The first end 226 has a first side 226a and a second side 226b, the second end 228 has a first side 228a and a second side 228b, the third end 230 has a first side 230a and a second side 230b and the fourth end 232 has a first side 232a and a second side 232b.

The sheet 218 has cling materials 236a, 236b, 236c and 236d. Cling materials 236a–d comprise an upper surface 238a, 238b, 238c, and 238d, and a lower surface 240a, 240b, 240c and 240d, respectively (the edges are lifted for illustration purposes only). The cling materials 236a–d further respectively comprise a first end 242a, 242b, 242c, and 242d, a second end 244a, 244b, 244c, and 244d, a third end 246a, 246b, 246c, and 246d, and a fourth end, 248a, 248b, 248c, and 248d. The fourth ends 248a–d of the cling materials 236a–d are connected in any manner described herein to the second sides 226b, 228b, 230b, and 232b, respectively, of the first end 226, the second end 228, the third end 230 and the fourth end 232 of the sheet of material 218.

FIGS. 14 and 15 illustrate one method of use of the present invention. A flower pot 212 is placed on the center of the sheet of material 218, between the ends 234a–d. The sheet 218 is shaped around the flower pot 112 by folding or wrapping each end 226, 228 230, and 232 of the sheet 218 upward, so that the sheet of material 218 covers at least a portion of the flower pot 212.

As shown in FIG. 14, the flower pot 212 is wrapped by first connecting cling materials 236b and 236c to the sheet 218. The lower surfaces 240b–c of the cling materials 236b–c, respectively, connect to the upper surface 220 of the sheet of material 218, overlaying respectively past the first side 226a of the first end 226 and the first side 228a of the second end 228 of the sheet 218.

As further illustrated in FIG. 15, cling materials 236a and 236d similarly engage the sheet of material 218, to effectively wrap the flower pot 212. That is, the lower surfaces 240a and 240d of the cling material 236a and 236d, respectively, connect to the upper surface 220 of the sheet 218. Cling material 236a overlaps past the first side 226a of the first end 226 of the sheet 218. Similarly, cling material 236d overlaps past the first side 232a of the fourth end 232 of the sheet of material 218.

Figure 17:
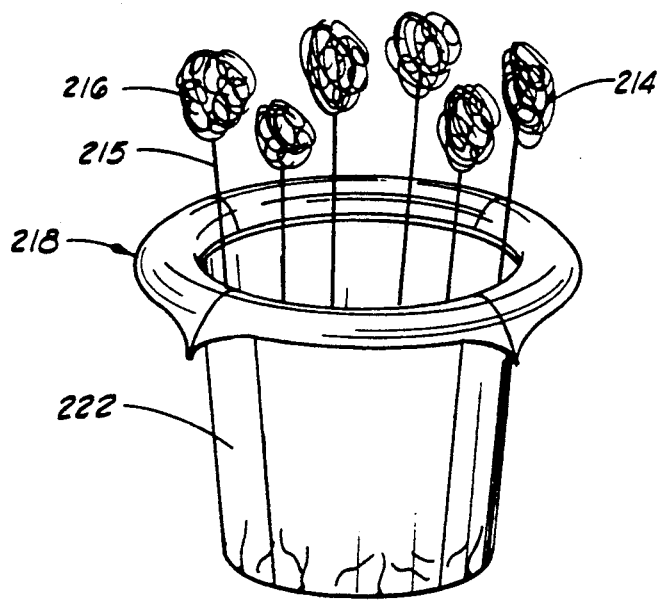
FIG. 17 is a perspective view of the wrapping material of the present invention, illustrating a wrapped flower pot containing a floral arrangement.

Referring now to FIGS. 16 and 17, the alternative preferred embodiment shown therein is substantially the same as the one previously shown in FIGS. 13 and 15. The only difference between FIG. 13 and 15 compared with FIG. 16 and 17 is the elongated ends 226s, 228s, 230s, and 232s of the sheet of material 118 shown in FIGS. 16 and 17, which forms a skirt. The wrapped flower pot 212 shown in FIG. 17 is wrapped in a manner identical to the one previously described and illustrated in FIGS. 14 and 15.

The Preferred Embodiment of FIGS. 18, 19, 20, 21 and 22

Figure 18:
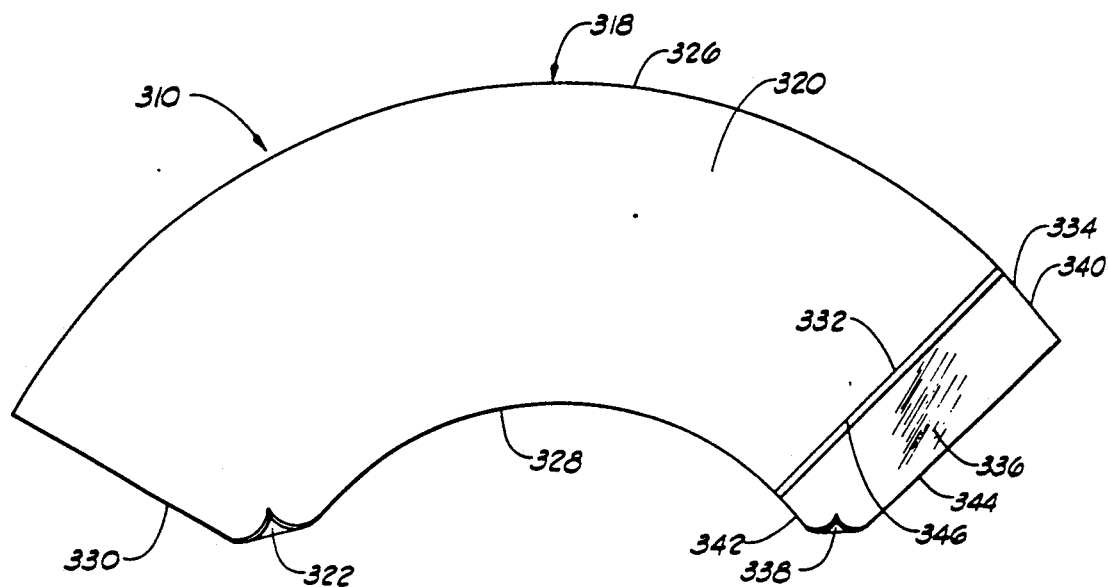
FIG. 18 is a top plan view of another embodiment of another embodiment of the wrapping material of the present invention.
Figures 19, 20:
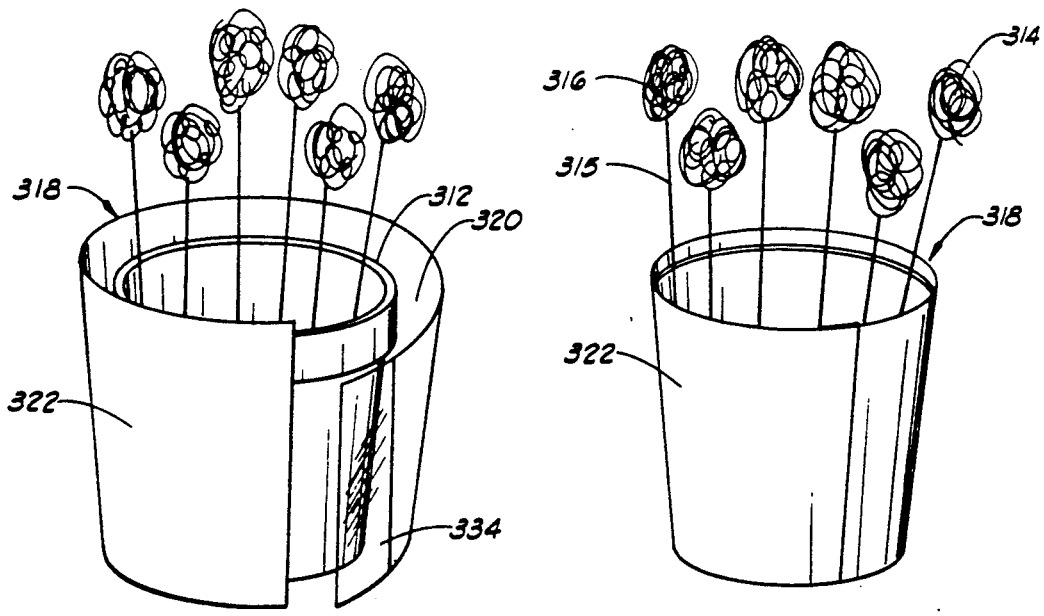
FIG. 19 is a perspective view of the wrapping material of the present invention, illustrating one method of wrapping a flower pot.
FIG. 20 is a perspective view of the wrapping material of the present invention, illustrating a wrapped flower pot containing a floral arrangement.

Another preferred embodiment of the present invention is shown in FIG. 18, 19 and 20. The wrapping material, generally designated by numeral 310, is used to wrap a flower pot 312, which preferably contains a flower arrangement 314 having a stem portion 315 and a growing portion 316. The wrapping material 310 of the present embodiment comprises a sheet of material 318.

Referring to FIG. 18, the sheet of material 318 comprises an upper surface 320 and a lower surface 322 (the edge lifted for illustration purposes only). The sheet of material 318 further comprises an elongated first end 326 and an elongated second end 328, both of which are arcuately shaped and in parallel alignment. The sheet of material 318 also has a third end 330 and a fourth end 332.

The sheet 318 also comprises a cling material 334. The cling material 334 has an upper surface 336, a lower surface 338, (the edge of which is lifted for illustration purposes only). The cling material 334 also comprises a first end 340, a second end 342, a third end 344, and a fourth end 346. The fourth end 346 of the cling material 334 is attached in any manner described herein to the fourth end 332 of the sheet of material 318.

FIGS. 19 and 20 illustrate one method of use of the present invention. The sheet 318 is shaped around the flower pot 312 by folding or wrapping, so that the sheet 318 covers at least a portion of the flower pot 312. That is, the sheet of material 318 is wrapped around the periphery of the flower pot 312; the relatively longer arcuate first end 326 extends around the top of the flower pot 312, and the relatively shorter arcuate second end 328 extends around the bottom of the flower pot 312. The lower surface 338 of the cling material 334 connects to the upper surface 320 of the sheet 318 near the third end 330. Alternatively, the upper surface 336 of the cling material 334 may connect to the lower surface 332 of the sheet 318.

FIGS. 21, 22 and 23 illustrate an alternative preferred embodiment of the present invention. FIG. 21 is substantially similar to the sheet of material 312 shown in FIG. 18. The only differences between FIG. 18 and FIG. 21 are the ruffled, extended first end 326a, the ruffled fourth end 332a of the sheet 318, and the location of the connection of the cling material 334a upon the sheet 312 shown in FIG. 21.

The cling material 334a is attached to the sheet 318 near the fourth end 332a. As illustrated in FIG. 22 and 23, the sheet of material 318 wraps a flower pot 312 in the same manner previously described for FIGS. 19 and 20.

For all embodiments shown and described previously herein, the sheet of material substantially forms a cover for the flower pot, which preferably contains a floral arrangement. And the sheet of material may be rewrapped, as desired, unlike a preformed flower pot cover. The wrapping material may be wrapped loosely or tightly and may form a cone-shaped wrap, or substantially conform to the shape of the flower pot being wrapped. Moreover, for the embodiments shown and described in FIGS. 1-17, it will be appreciated that the shaped sheet of material also capable of sustaining a floral arrangement without the use of a flower pot.

Moreover, with regard to the previously described embodiments having elongated ends forming extensions away from the flower pot, i.e., skirts, it will be appreciated that the design of the skirts may vary. That is, any design of skirt, for example, smooth, ruffled, scalloped, or the like, may be utilized.

The above-defined embodiments of the present invention provide a quick and easy wrapping material without the need of tape or other additional adhesives. It can be waterproof and may also provide visual observation of the item wrapped.

Changes may be made in the embodiments of the invention described herein or in parts or elements of the embodiments described herein or in the steps or in the sequence of steps of the methods described herein without departing from the spirit and scope of the invention as defined in the following claims.

What is claimed is:

1. A flower port wrapping material for wrapping about at least a portion of a flower pot, comprising:
   a sheet of material having an upper surface and a lower surface sized to wrap at least a portion of the flower pot; and
   a plurality of cling materials, wherein a portion of a surface of each cling material overlaps and connects to a portion of a surface of the sheet of material, and
   wherein the cling material is capable of connecting to the sheet of material and itself upon contacting engagement and wherein the sheet of material with the cling material connected thereto is wrappable about the flower pot whereby portions of the cling material contactingly engage and connect to other portions of the wrapping material for generally securing the sheet of material wrapped about at least a portion of the flower pot.

2. The wrapping material of claim 1 wherein the sheet of material is at least partially wrapped about a flower pot having a floral arrangement therein.

3. The wrapping material of claim 1 wherein the sheet of material is selected from the group consisting of cloth, paper, cellophane, foil, man-made organic polymer film and combinations thereof.

4. The wrapping material of claim 1 wherein the cling material comprises polyethylene.

5. The wrapping material of claim 1 wherein a portion of at least one surface of the cling material overlaps and is connected to a portion of at least one surface of the sheet of material, only an insubstantial portion of the one surface of the cling material overlapping and being connected to only an insubstantial portion of the one surface of the sheet of material so that a substantial portion of the one surface of the cling material extends beyond the one surface of the sheet of material.

6. The wrapping material of claim 5 wherein one of the cling materials is secured to at least a portion of the upper surface of the sheet of material.

7. The wrapping material of claim 5 wherein one of the cling materials is secured to at least a portion of the lower surface of the sheet of material.

8. The wrapping material of claim 5 wherein one of the cling materials is secured to at least a portion of the upper surface of the sheet of material and one other cling material is secured to at least a portion of the lower surface of the sheet of material.

9. The wrapping material of claim 1 wherein the cling material comprises a thickness in a range of about 0.2 mils to about 10 mils.

10. The wrapping material of claim 1 wherein the cling material comprises a thickness in a range of about 0.6 mils to about 2 mils.

11. The wrapping material of claim 1 wherein the sheet of material comprises a thickness in a range of about 0.2 mils to about 10 mils.

12. The wrapping material of claim 1 wherein the sheet of material comprises a thickness in a range of about 0.5 mils to about 2.5 mils.

* * * * *

UNITED STATES PATENT AND TRADEMARK OFFICE
CERTIFICATE OF CORRECTION

PATENT NO. : 5,332,610
DATED : July 26, 1994
INVENTOR(S) : Weder et al.

It is certified that error appears in the above-indentified patent and that said Letters Patent is hereby corrected as shown below:

Title Page, under Related U.S. Application Data, [63], line 9, after 'and', please insert --said application 07/677,225 is also--.

Column 1, line 10, please delete "SELF ADHERING WRAPPING MATERIAL FOR WRAPPING FLOWER POTS AND METHOD OF USING SAME", and substitute therefor --METHOD FOR WRAPPING FLOWER POTS USING A SELF ADHERING WRAPPING MATERIAL--.

Column 1, line 19, please delete "METHOD AND APPARATUS FOR COVERING PORTIONS OF AN OBJECT WITH A SHEET OF MATERIAL HAVING A PRESSURE SENSITIVE ADHESIVE COATING APPLIED TO AT LEAST A PORTION OF AT LEAST ONE SURFACE OF THE SHEET OF MATERIAL", and substitute therefor --METHOD FOR WRAPPING AN OBJECT WITH A MATERIAL HAVING PRESSURE SENSITIVE ADHESIVE THEREON--.

Column 1, line 33, after 'and', please insert --said application 07/677,225 is also--.

Column 1, line 34, please delete "FLOWER POT ACCESSORY", and substitute therefor --METHOD OF SHAPING AND HOLDING A SHEET OF MATERIAL ABOUT A FLOWER POT WITH A COLLAR--.

Column 2, line 51, after 'view', please delete "of another embodiment".

UNITED STATES PATENT AND TRADEMARK OFFICE
CERTIFICATE OF CORRECTION

PATENT NO. : 5,332,610
DATED : July 26, 1994
INVENTOR(S) : Weder et al.

It is certified that error appears in the above-indentified patent and that said Letters Patent is hereby corrected as shown below:

Column 3, line 15, please delete "metals", and substitute therefor --petals--.

Column 6, line 3, please delete "26b", and substitute therefor --28a--.

Column 7, line 11, please delete "second", and substitute therefor --third--.

Column 7, line 28, please delete "second", (second occurrence), and substitute therefor --fourth--.

Column 8, line 6, please delete "right", and substitute therefor --second--.

Column 8, line 16, please delete "second", and substitute therefor --first--.

Column 8, line 16, please delete "130a", and substitute therefor --130--.

Signed and Sealed this

Twenty-eight Day of February, 1995

Attest:

BRUCE LEHMAN

Attesting Officer

Commissioner of Patents and Trademarks